Patented Mar. 28, 1950

2,502,264

UNITED STATES PATENT OFFICE 2,502,264

QUINOLINE DERIVATIVES HAVING ANTI-MALARIAL PROPERTIES

Robert E. Lutz, Charlottesville, Va., and Joseph B. Koepfli, San Marino, and Edwin R. Buchman, Pasadena, Calif., assignors to the United States of America as represented by the Secretary of War No Drawing. Application June 25, 1946, Serial No. 679,270

4 Claims. (Cl. 260—288)

The present invention relates to a new series of synthetic compounds and more particularly to a novel group of carbinols resembling quinine in structure and characterized by pronounced antimalarial activity.

In 1938 the synthesis of a compound (A) resembling quinine (B)

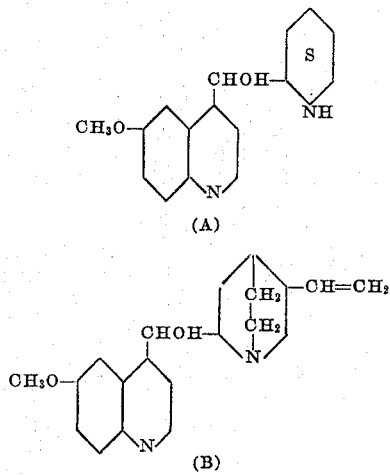

in structure and possessing activity against certain forms of avian malaria was announced by Ainley and King [Proc. Royal Soc. 125 B, 60 (1938)]. Although the activity of compound (A) in bird malaria was only about one-fourth to one-third that of quinine itself, the announcement stimulated considerable interest inasmuch as it indicated that the α-quinuclidyl radical of the quinine molecule (B) could be replaced by a 2-piperidyl group without destroying the antimalarial activity of the resulting compound against avian infections.

Interest in synthetic quinine-like compounds was further stimulated in 1940 when King and Work reported [Jour. Chem. Soc. 1307 (1940)] the preparation of (C)

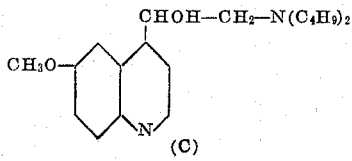

which had a dialkylaminomethyl group in place of the quinuclidyl ring of the quinine molecule and which was likewise active in avian malaria. As in the case of (A), the activity of (C) against avian malaria was also of a relatively low order (about one-third that of quinine); nevertheless both cases suggested the possibility that the inherent antimalarial activity of quinine might be attributed to the quinolyl carbinol part of the molecule and that a readily synthesized quinine-like drug of high antimalarial activity might be produced by retaining the quinoline methanol portion of the quinine molecule and modifying the non-aromatic basic group attached to the carbinol, and/or the nuclear substituents in the various ring or rings present in the molecule.

The foregoing working hypothesis, while forming no part of the present invention, nevertheless led to the discovery of a new series of quinine-like compounds of high antimalarial activity. These compounds, broadly stated, consist of a new series of synthetic carbinols which represent a subgroup of the class having the characteristic structure (E):

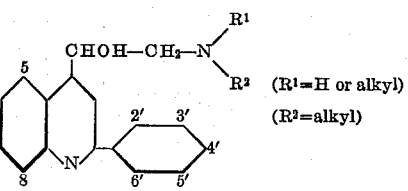

($R^1$=H or alkyl)
($R^2$=alkyl)

the subgroup being distinguished from the class as a whole by the presence of a halogen atom in one or more of the numbered positions shown in (E); i. e., in the presence of at least one halogen atom in the benzenoid ring of the quinoline nucleus and/or in the phenyl radical attached to the 2-position of the quinoline nucleus. Thus the present series of quinine-like compounds represent the halogen-containing derivatives of (E), and may be classified into three main types:

Type A.—Those containing at least one halogen atom in the benzenoid ring of the quinoline nucleus, with or without other nuclear substituents in the molecule;

Type B.—Those containing at least one halogen atom in the phenyl group attached to the 2-position of the quinoline nucleus, with or without other nuclear substituents in the molecule; and

*Type C.*—Those containing at least one halogen in both of such rings, with or without other nuclear substituents in the molecule.

As indicated, in addition to the "primary" substituent or substituents, (i. e., halogen) one or more supplementary substituents may also be present in the molecule, either in the quinoline nucleus or in the phenyl group, or both.

The antimalarial potency of such halogen-containing compounds depends upon several factors, including among other things (a) the number, nature and position of the "primary" substituent (halogen) in the ring or rings mentioned above; (b) the number, nature and position of any "supplementary" ring substituent or substituents that may be present in the molecule; and (c) the nature of the $R^1$ and $R^2$ groups attached to the nitrogen in the basic side chain of the quinoline nucleus. However, in all cases investigated, judged on the basis of comparative tests against *P. lophurae* in the duck, the antimalarial activities of the halogen-containing compounds contemplated by the present invention are significantly greater than those of the corresponding non-halogenated compounds. Indeed, on this basis, the individual members of this new series of halogen-containing quinine-like carbinols are generally characterized by antimalarial activities ranging roughly from about twice to about thirty-two times that of quinine itself. It will thus be apparent that the compounds of the present invention are characterized by potent antimalarial properties.

Before describing the synthesis of the compounds with which the present invention is concerned, it may be helpful to indicate in a general way the approximate effect produced on the antimalarial potency of the parent class of compounds (E), (a) by "primary" substitutions (i. e., by halogen);

(b) by "supplementary" substitutions (e. g., by alkyl, alkoxy, aryl, etc.); and (c) by variations in the nature of the $R^1$ and $R^2$ groups attached to the nitrogen in the basic side chain of the quinoline ring.

In the following discussion the relative effectiveness of a given compound against *P. lophurae* in the duck will be taken as an index of antimalarial activity.

Considering first the effect of halogen substitutions on antimalarial potency, generally speaking, other factors being appropriately balanced, the compounds of Type B are usually more active than those of Type A; while those of Type C are usually more active than those of Type B.

To illustrate this general observation, the presence of one or more chloro groups, for example, in position 6, 7 and/or 8 of the benzenoid nucleus results in a substantial enhancement of the antimalarial potency of the parent class of compounds (E), raising the quinine equivalent by a factor of roughly 2 to 4, depending in part upon the nature of the other groups in the molecule, particularly the nature of the alkyl group or groups attached to the nitrogen in the basic side chain. The effect of replacing one or more hydrogens in the phenyl group located in position 2 is, in many instances, even more pronounced; the replacement of the para-hydrogen by a chloro group, for example, in most instances enhances the antimalarial potency of the parent compound (E) by a factor of 4 or more. Still more dramatic effects are produced by replacing, by halogen, one or more hydrogens in each of the phenyl and benzenoid rings; in such instances the antimalarial potency of (E) may be increased by a factor ranging from about 4 to as high as 16 or more.

The effect of substituents in addition to halogen depends at least partly on the nature, number and relative positions of both the primary and supplementary substituents. In some instances, the activity of a compound containing the primary (halogen) substituent may be further increased by supplementary substitutions (e. g., by the substitution of an alkyl group in position 8); in other instances the activity may be apparently unaffected (as in the case of the substitution of an alkoxy group in position 6); and in still other instances, the activity may be apparently decreased to some extent by the supplementary substitution. However, in no case thus far investigated has the antimalarial activity of a compound of class (E) containing one or more primary (halogen) substituents been destroyed by supplementary substitutions. Furthermore, it is conceivable that the supplementary substituent or substituents, even though in some instances apparently reducing the activity of the parent halogen-containing compound to some extent, may produce compensating effects of a desirable nature; for example, the supplementary substituents may increase the solubility or the rate of absorption of the compound, or decrease its toxicity to the host. The supplementary substituents therefore provide a convenient means either for still further enhancing the antimalarial activity of the halogen-containing compound, and/or for modifying the solubility, toxicity or other properties of the drug.

As regards the effect of variations in the alkylaminomethyl group, it appears to be characteristic of the class of compounds (E) as a whole, as well as of the halogen-containing subclass contemplated by the present invention, that for any given homologous series, the members of which differ from each other only in the $R^1$ and/or $R^2$ groups, there exists an optimum "nucleus-side chain relationship" insofar as antimalarial potency is concerned. In other words, if one plots the antimalarial activity of a homologous series of compounds of class (E) against the number of carbon atoms attached to the nitrogen in the mono- or di-alkylaminomethyl group, one obtains a curve which rises to a maximum and then falls off, the maximum usually occurring at an intermediate number of carbon atoms. The inflection point (maximum) of such a curve for one homologous series may differ from that of another homologous series of the same class of compounds (E), and generally speaking, the inflection point for the more heavily ring-substituted homologues will occur at a lower number of carbon atoms than is the case for an unsubstituted or moderately ring-substituted homologous series.

To illustrate: In the homologous series of compounds having the characteristic structure (F)

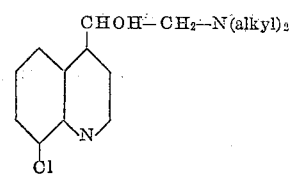

(F)

the antimalarial activity of the di-n-hexyl compound exceeds that of the corresponding di-n-butyl compound as well as that of the di-n-octyl compound. This is also roughly true in the corresponding 7-chloro homologous series, or the 6,8-dichloro series, or the 2(p-chlorophenyl) series. However, in the more heavily ring-substituted homologous series of compounds, such as that having the characteristic structure (G):

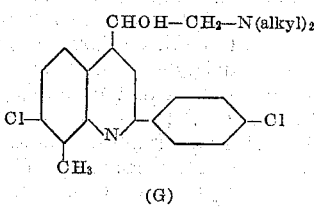

(G)

the activity of the di-n-butyl compound exceeds that of the corresponding diethyl compounds as well as that of the di-n-hexyl compounds.

In other words, within limits, and with some exceptions, in the case of those compounds having a "heavily loaded" or "heavily substituted" quinoline nucleus, the optimum activity is usually attained with a side chain of relatively low molecular weight, whereas in the case of the compound having a "lightly loaded" or "lightly substituted" quinoline nucleus, the optimum activity appears to be attained with a side chain of somewhat higher molecular weight.

With these general "rule of thumb" observations as a background, the preparation and properties of a number of specific embodiments of the invention may now be described. It should be clearly understood, however, that the specific details given below are intended neither to delineate the breadth of the invention nor to limit the scope of the appended claims, but merely to provide a number of concrete examples illustrative of the general principles involved.

Method of preparation

The synthesis of the novel carbinols of the present invention, as described in detail hereinafter, may be represented by the following general scheme, wherein "Q" represents a 4-[2-phenylquinolyl] group having at least one halogen atom in the position or positions mentioned above, with or without other nuclear substituents such as alkyl, alkoxy, aryl and the like:

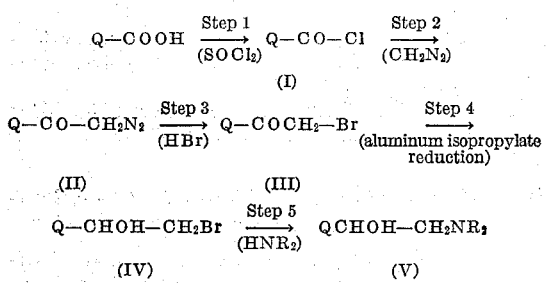

Generally speaking, the overall yields from Step 1 through Step 5 average from about 25% to about 35% of the theoretical.

Step 1 is more or less standard or conventional and requires no special comment.

Step 2 is readily carried out by slowly adding the acid chloride (I) (free, or in the form of its hydrochloride) to diazomethane in a solvent (e. g., methylene chloride), the reaction mixture being stirred for several hours after the addition is complete. The reaction goes well except for the 5-chloro types where more drastic conditions (e. g., longer reaction time) seem to be required because of steric hindrance. The diazoketone (II) usually crystallizes from the reaction mixture, cooling being required in some cases. The diazoketone (II) need not be recrystallized before being used in the subsequent step; preferably, however, it is washed with a suitable solvent.

Step 3 is carried out by adding strong (e. g., 48%) HBr to the solid, partly-purified diazoketone (II) suspended in a reaction medium (e. g., absolute ether), this treatment producing a bromoketone hydrobromide except where salt formation is prevented by an 8-chloro group. The bromoketone (III) is usually somewhat sensitive to heat and care is therefore required in purification; long heating either alone or in solvents should be avoided.

Step 4 utilizes the free bromoketone (III) or its salt, reduction being accomplished preferably by means of aluminum isopropylate. Most of the 2-phenyl types reduce with moderate ease and in good yields, although in the case of the 2-(3',4'-dichlorophenyl) compound, the reaction proceeds with surprising rapidity; indeed, in this case, the reaction has not been stopped successfully at the bromohydrin stage. The 5-chloro-2-phenyl bromoketone, presumably because of steric hindrance, does not undergo reduction by aluminum isopropylate under ordinary conditions. Where difficulty is encountered in this step, it has been found that the addition of a considerable amount of dioxane to the aluminum isopropylate reaction mixture enables the reduction to be carried out in certain instances where it could not otherwise be accomplished.

Step 5 goes well in most cases at 70-130° C. (usually 60-90° C.) and a reaction time of about 3-24 hours (usually 10-24 hours), using a mole ratio of amine to bromohydrin (IV) of from 3:1 to 5:1. In some cases the bromohydrin hydrochloride or hydrochloride is preferable to the free base (IV). The reaction mixture is worked up by separating the free excess amine (HNR₂) either by distillation or by titrating out (precipitating) the unused amine as the hydrochloride, using standard ether-HCl. In the latter case, after the NHR₂·HCl has been separated, the addition of the ether-HCl to the filtrate may be continued until the monohydrochloride (or in some instances, the dihydrochloride) of the desired product (V) is obtained.

With this general description as a background, we will now turn to a detailed description of the synthesis of specific representative compounds.

EXAMPLE I

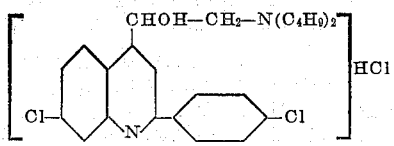

(a) 7-chloro-2-(4-chlorophenyl)-cinchoninic acid

A solution of 255.2 g. (2 moles) of 3-chloroaniline in 1800 ml. of absolute ethanol was placed in a 5 liter 2-neck flask fitted with a mechanical stirrer, reflux condenser, and a dropping funnel. The solution was stirred mechanically while 281.2 g. (2 moles) of solid 4-chloro-benzaldehyde was added slowly. The yellow solution was refluxed ten minutes; then 176 g. (2 moles) of pyruvic acid dissolved in 176 ml. of absolute ethanol was added slowly over a period of twenty-five minutes to the well stirred solution. With continuous stirring the reaction mixture was refluxed six hours. Within five minutes after the addition of pyruvic acid had been completed, a precipitate formed which increased in amount as the reaction proceeded.

The reflux condenser was rearranged for downward distillation and 1 liter of ethanol was distilled off in fifty minutes. The reaction flask and its contents were then cooled in an ice bath overnight. The mixture was filtered and the residue was washed by slurrying with 300 ml. and then 450 ml. of 80% ethanol.

The pale yellow residue is a mixture of the pyrrolidone and the cinchoninic acid. To separate these components the residue was powdered; then treated with a solution of 200 g. of $Na_2CO_3 \cdot H_2O$ in 1750 ml. of water. The mixture was stirred mechanically; heated to 95–98° C. and held at this temperature for thirty minutes. There was a strong tendency for the mixture to foam violently when the temperature exceeded 98° C. The hot mixture was filtered by suction. The filtrate contained the sodium salt of the acid which is not very soluble in cold water, and the residue was almost pure pyrrolidone.

The brown filtrate was boiled with charcoal (Darco) and filtered in an unsuccessful attempt to remove some of the color. This solution was diluted to 6 liters and acidified slowly with glacial acetic acid to give a pink precipitate of crude acid. The acid was filtered; dried at 110° C. to give 97.5 g. (15%) yield of crude product. This solid was purified by digesting with 1400 ml. of boiling 2-butanone for one hour; then cooling overnight. The mixture was cooled in an ice-salt bath for two hours; then filtered by suction with difficulty. The residue was washed with acetone and dried yielding 87 g. of colorless rods melting at 271–287° C. which was pure enough for use in the work described below.

Some of the acid was repeatedly recrystallized from 2-butanone to constant melting point of 340–341° C.

Analysis: Calculated for $C_{16}H_{19}Cl_2NO_2$: N, 4.40%; found: N, 4.15%.

(b) *1-(3-chlorophenyl)-5-(4-chlorophenyl)-3-(3-chlorophenylimino)-2-pyrrolidone*

The pyrrolidone residue obtained above was treated with charcoal (Darco) and recrystallized from glacial acetic acid to give colorless needles melting at 206–208° C.; yield 158 g.

Analysis: Calculated for $C_{22}H_{15}ClN_2O$: C, 61.48%; H, 3.52%; found: C, 61.63%; H, 3.74%.

(c) *7-chloro-2-(4-chlorophenyl)-cinchoninyl chloride hydrochloride*

One hundred and ninety-six grams (0.617 mole) of the acid from step (a) was put in a 3 liter flask together with a few boiling chips; then 1.5 liter of thionyl chloride was added. The mixture was refluxed forty-five minutes to give an orange solution; then the excess thionyl chloride was distilled off under reduced pressure (water pump). The pale yellow residue was slurried with 600 ml. of dry benzene, then the benzene was removed under reduced pressure, thereby sweeping out the last traces of thionyl chloride. The residual yellow solid was cooled in an ice bath; then slurried with 1 liter of anhydrous ether. The solid was powdered under the ether, treated with a little ethereal hydrogen chloride to ensure complete conversion of all the acid chloride to the hydrochloride, and then cooled in an ice bath an hour. The mixture was filtered and the residue washed with anhydrous ether. The yield of long yellow needles was 200 g. (87%); melting point 159–161° C. This compound, without further purification, was analyzed.

Analysis: Calculated for $C_{16}H_8Cl_2NO \cdot HCl$: N, 4.16%; found: N, 4.34%.

(d) *7-chloro-2-(4-chlorophenyl)-4-(α-diazoacetyl)-quinoline*

A 5 liter 3-neck flask equipped with a stainless-steel anchor-type stirrer was cooled in an ice-water bath and 3100 ml. of 0.585 N solution of diazomethane in methylene chloride was added. The solution was stirred mechanically while 100 g. of acid chloride of step (c) was added portionwise. A fairly vigorous reaction occurred and a cream colored precipitate formed. The mixture was stirred and kept at 0° C. for nine hours. When the solution was not kept cold, the yield of diazoketone was decreased. The mixture was filtered, and the residue was washed twice with two portions of 350 ml. of anhydrous ether and pressed dry. The yield of white solid was 80 g. (86%).

A small sample of the diazoketone was repeatedly recrystallized to constant melting point from anhydrous ethyl acetate as colorless needles. It began to darken at 159° C. and melted at 173° C.

Analysis: Calculated for $C_{17}H_9Cl_2N_3O$: N, 12.28%; found: N, 12.60%.

(e) *4-(α-bromoacetyl)-7-chloro-2-(4-chlorophenyl)-quinoline hydrobromide*

A suspension of 66.5 g. (0.194 mole) of the diazoketone of step (d) in 1 liter of anhydrous ether in a 3 liter flask equipped with a stainless steel anchor-type stirrer was cooled in a bath of ice water. The mixture was mechanically stirred while 100 ml. of a solution composed of equal parts by volume of 48% aqueous hydrobromic acid and anhydrous ether was added. The white solid became yellow and the final mixture was stirred one hour; then, since the mixture became so thick that stirring was very difficult, it was filtered. The residue was washed with ethanol and dried.

The crude bromoketone was slurried with 200 ml. of boiling glacial acetic acid; then the mixture was allowed to cool slowly to 18° C. The yellow solid was filtered; washed twice with anhydrous ether, and air dried. The yield was 78.5 g. (85%).

A sample of the bromoketone was recrystallized from glacial acetic acid to give yellow needles melting at 238–240° C.

Analysis: Calculated for $C_{17}H_{10}BrCl_2NO \cdot HBr$: C, 42.89%; H, 2.33%. Found: C, 43.07%; H, 2.59%.

(f) *α-Bromomethyl-7-chloro-2-(4-chlorophenyl)-4-quinoline carbinol hydrochloride*

A suspension of 65.5 g. (0.137 mol) of the bromoketone of step (e) in 275 ml. of C. P. isopropanol was placed in a 1 liter flask equipped with an anchor-type glass stirrer and a short Vigreaux column. The suspension was stirred mechanically and the mixture was heated to boiling on a water bath; then 150 ml. of hot 3 N aluminum isopropylate solution was added. The mixture slowly became black and a homogeneous solution resulted. Isopropanol was slowly distilled through the column for forty minutes until a negative test for acetone in the distillate was obtained. The solution was treated with 250 ml. of water and an oil separated. The mixture was stirred mechanically and cooled in an ice bath while 125 ml. of concentrated hydrochloric acid was added. A brown homogeneous solution was obtained, but as the cooling and stirring was continued, a yellow crystalline solid separated. The mixture was filtered and the residue was washed well with water.

The residue was slurried with 225 ml. of boiling isopropanol for forty-five minutes; then the mixture was cooled in an ice bath. Upon filtering the mixture a pale yellow crystalline residue was obtained. It was washed with ether and dried in an evacuated desiccator to yield 49.2 g. (82%) of the bromohydrin hydrochloride. This compound melted at 270° C. and was analyzed and used without further purification.

Analysis: Calculated for $C_{17}H_{10}BrCl_2NO \cdot HCl$: N, 3.24%; found: N, 3.22%.

This compound was so insoluble in the common solvents that it could not be recrystallized.

(g) dl 7 - chloro-2-(4-chlorophenyl)-α-(di-n-butylaminomethyl) - 4 - quinoline carbinol mono hydrochloride A mixture of 145.8 g. (0.336 mol) of the bromohydrin hydrochloride of step (f) and 217 g. (1.68 moles) of di-n-butylamine in a 1 liter Erlenmeyer flask was stirred by hand to break up the lumps which formed when the two substances were mixed. The brown mixture was heated ten hours in a constant temperature bath at 74° C. The mixture was colled to room temperature and diluted with 1 liter of anhydrous ether. The precipitate of di-n-butylamine hydrochloride and hydrobromide which formed was filtered and dried yielding 106 g. (83% of the calculated amount).

The ether was distilled off the filtrate at atmospheric pressure; then the excess dibutylamine was removed by distillation at 98° C. at 2 mm. The dark residual oil was cooled to room temperature, then dissolved in 1 liter of anhydrous ether. This red brown solution was shaken with 5 g. of charcoal (Darco) and filtered to remove some of the color. The filtrate was diluted with 250 ml. of C. P. acetone and was stirred mechanically while 362 ml. of 0.85 N ethereal hydrogen chloride was added dropwise to precipitate the mono hydrochloride of the amino alcohol. The mixture was cooled to −15° C. in an ice-salt bath and mechanically stirred for one hour. To facilitate stirring 200 ml. of anhydrous ether and 100 ml. of C. P. acetone were added to the mixture. The mixture was filtered and the residue pressed dry. The solid was powdered and slurried with 1 liter of anhydrous ether; then it was filtered and the residue pressed dry. The amino alcohol hydrochloride was dried in an evacuated desiccator to yield 131 g. (82%).

The amino alcohol can be recrystallized from ethanol and ethyl acetate as long colorless needles or from ethanol and anhydrous ether as short, prismatic rods which darken at 186° C. and melt at 188–189° C. with decomposition. This amino alcohol is very soluble in ethanol, methanol, and dioxan; slightly soluble in isopropanol, 40% ethanol, and water, and insoluble in ether, ligroin, and ethyl acetate.

Analysis: Calculated for $C_{25}H_{30}Cl_2N_2O \cdot HCl$: C, 62.30%; H, 6.48%; Cl⁻, 7.37%; N, 5.81%; found: C, 62.20%; H, 6.63%; Cl⁻, 7.36%; N, 6.03%.

When this compound was recrystallized from isopropanol, a white solid with the same melting point as above was obtained but the analysis for chloride ion was low.

Analysis: Calculated for $C_{25}H_{30}Cl_2N_2O \cdot HCl$: Cl, 7.37%; found: Cl, 6.67%.

Repeated recrystallizations from isopropanol did not change the analytical data. If the compound contained one molecule of isopropanol of crystallization, the calculated analysis of chloride ion would be 6.57%. To check on this possibility, 0.7761 g. of this compound was heated to 100° C. under a pressure of 2 mm. for three hours; it was then found to weigh 0.7185 g. The loss in weight was 0.0576 g. or 7.43%, but if one molecule of isopropanol had been present, an 11.08% loss in weight should have occurred. The compound dried in this manner analyzed correctly for chloride ion (found 7.33% Cl⁻).

EXAMPLE II

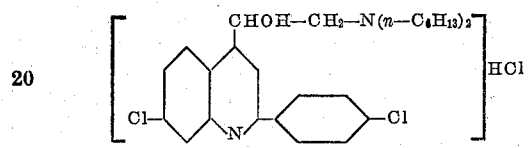

dl 7 - chloro - 2 - (4 - chlorophenyl) - α - (di - n - hexylamino - methyl) - 4 - quinoline carbinol mono hydrochloride A mixture of 23.7 g. (0.055 mol) of the bromohydrin hydrochloride from step (f) of Example I and 51.2 g. (0.277 mol) of dihexylamine in a 125 ml. Erlenmeyer flask was stirred by hand to break up the lumps which formed when the two substances were mixed. The brown mixture was heated twelve hours at 80° C.; then it was cooled to room temperature and diluted with 300 ml. of anhydrous ether. The precipitate of dihexylamine hydrochloride and hydrobromide which formed was filtered, washed with ether and dried yielding 24.2 g. (90% of the calculated amount).

The filtrate was diluted with 200 ml. of C. P. acetone and the excess dihexylamine was fractionally precipitated with 0.85 N ethereal hydrogen chloride. After completion of the precipitation of dihexylamine, the amino alcohol mono hydrochloride was then precipitated as a tan solid with the calculated amount of 0.85 N ethereal hydrogen chloride. The mixture was cooled in an ice bath and then filtered. The tan residue was washed with ether and dried in an evacuated desiccator. Yield of crude amino alcohol mono hydrochloride was 23.3 g. (79%).

The product was repeatedly recrystallized from anhydrous ethyl acetate yielding colorless needles melting at 190–192° C.

Analysis: Calculated for $C_{29}H_{38}Cl_2N_2O \cdot HCl$: Cl⁻, 6.61%; found: Cl⁻, 6.58%.

EXAMPLE III

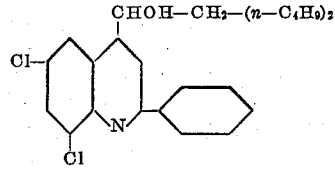

(a) 6,8-dichloro-2-phenyl-cinchoninyl chloride

A mixture of 150 g. (0.47 m.) of 6,8-dichlorocinchophen (M. P. 242–243° C.) and 300 cc. (a large excess) of technical thionyl chloride was placed in a 2-liter, two-neck, ground joint flask which was equipped with a reflux condenser and an attached $SO_2$-HCl trap. The center neck of the flask was arranged to carry a heavy stainless steel stirrer but was closed at the start of the reaction with a ground glass stopper. The reaction mixture was slowly heated on a water bath at such a rate as to insure a steady evolution of SO₂-HCl. The mixture was then maintained at gentle reflux until the acid dissolved completely (2-4 hours). Reflux was continued for one hour after solution was complete. At this point the stainless steel stirrer (well sealed) was inserted and the excess thionyl chloride was removed from the mechanically stirred solution under reduced pressure. The acid chloride solidified rapidly when somewhat less than half of the thionyl chloride had been removed. The mechanical stirring prevents the formation of a hard cake which is difficult to handle and at the same time facilitates the removal of the rest of the thionyl chloride. When the bulk of the thionyl chloride had been removed, 300 cc. of ligroin (B. P. 70-90° C.) was added and this mixture was then well stirred to a paste, cooled to 0° C. and filtered with suction under a hood. The light yellow acid chloride was washed with 50-100 cc. of cold ligroin and then sucked dry (5 min.) in the funnel. Any remaining thionyl chloride or ligroin was removed by placing the product in a vacuum desiccator for 3-4 hours. The product weighed 153 g. (96%) and melted at 136-137° C.

(b) *4-(α-bromoacetyl)-6,8-dichloro-2-phenyl-quinoline*

A solution of 73 g. (1.74 m.) of diazomethane in 3400 cc. of ether which had been dried for 3 hours over solid potassium hydroxide was placed in a 5-liter, two-neck flask which was equipped with an efficient stainless steel stirrer. The acid chloride (153 g.) was added portionwise (15-20 min.) to the ice-cooled mechanically stirred diazomethane solution. This mixture was then stirred for 13 hours while the temperature was allowed to rise slowly to that of the room. To the bright yellow diazoketone-ether mixture, cooled in an 18° C. water bath, was next added a solution of 175 g. (1.04 m.) of 48% aqueous hydrobromic acid in 150 cc. of ether (the ether and acid were mixed in an ice bath). Mechanical stirring was maintained during this addition (30 min.) and was then continued for 4½ hours. This mixture was then cooled in an ice-salt mixture and the bromoketone (free base) was removed by filtration, washed with a little cold ether and then thoroughly with water. In order to obtain an appreciable additional quantity of the bromoketone, the filtrate was extracted well with water and then the ether was largely removed by distillation. This concentrate (200 cc.) was cooled and handled as above. The combined precipitates when dry were dissolved in 1300 cc. of hot butanone. This hot solution was filtered, then diluted, while warm with 700 cc. of isopropanol, and cooled in an ice-salt mixture. The product was filtered off and air dried. It weighed 147 g. (81%) and melted at 155-157° C. (d).

(c) *α-Bromomethyl-6,8-dichloro-2-phenyl-4-quinolinemethanol*

The 147 g. (0.372 m.) of bromoketone was suspended in 800 cc. of dry isopropanol and 400 cc. (0.40 m.) of 3 N aluminum isopropylate in isopropanol was added to the mixture. This mixture was heated on a water bath at such a temperature that the isopropanol distilled off at a rate of approximately 60 drops per minute. After fifteen minutes of heating the solid dissolved. Distillation of the isopropanol (and acetone) from the deep red-purple solution was continued for 3 hours at approximately the same rate. At the end of this time the isopropanol which remained was removed by distillation under reduced pressure. To the cool residue was added slowly 300 cc. of water and then 300 cc. of concentrated hydrochloric acid. The mixture was mechanically shaken for two hours and then the crude but very nearly white bromohydrin (free base) was filtered off and washed well with six normal hydrochloric acid then with water. When dry it weighed 145 g. and melted at 136-138° C. with bubbling and decomposition. This crude product was difficult to purify by recrystallization. It gave completely satisfactory results, however, in the amine condensation, when used without further purification.

(d) *6,8-dichloro-α-(di-n-butylaminomethyl)-2-phenyl-4-quinoline methanol monohydrochloride*

A mixture of 20 g. (0.05 m.) of the bromohydrin (M. P. 136-138° C.), 19.4 g. (0.15 m.) of di-n-butylamine and 30 cc. of toluene was heated at 85° C. for 15 hours. The resulting mixture was cooled, and diluted with 600 cc. of dry ether. The di-n-butylamine hydrobromide which separated was filtered off and washed with ether. It weighed 10.0 g. (95% of the theoretical value). The ether was removed from the filtrate by evaporation at reduced pressure. The toluene and excess di-n-butylamine were removed from the residual oil by distillation at high vacuum at the temperature of a boiling water bath. The pink oil which remained was dissolved in a mixture of 600 cc. of dry ether and 100 cc. of dry acetone. This solution was made just acid (to Alkacid paper) with ethereal-HCl. The product separated as a pink solid. It was filtered off and washed with ether. This crude product weighed 22.5 g. It was dissolved in 350 cc. of cyclohexanone by heating to approximately 120° C. This solution was filtered and then diluted while hot with 350 cc. of ligroin. This hot solution was then cooled to 0° C. in an ice-salt mixture and the white crystalline solid was filtered off and dried. It weighed 17 grams (71%) and melted at 183-185° C.

Analysis: Calculated for $C_{25}H_{30}Cl_2N_2OHCl$: $Cl^-$, 7.36; found: $Cl^-$, 7.46.

EXAMPLE IV

*Properties of typical compounds*

The physical constants (M. P. of various salts) and the "quinine equivalents" of a large number of representative compounds in accordance with the present invention (prepared by processes similar to that illustrated in Examples I-III) are given in Table I. The "quinine equivalents" shown in this table were determined on the basis of comparative tests against *P. lophurae* in the duck.

For purposes of comparison, Table I includes data on the properties of several related compounds that do not contain halogen; these compounds serve to emphasize the effectiveness of one or more halogen substituents in enhancing the antimalarial potency of the parent substance from which the halogen compounds may be regarded as being derived.

TABLE I

*Effect of various substituents on the antimalarial activity of α-(alkylaminomethyl)-4-quinoline methanols*

In this table the letters indicate as follows: (a) dihydrochloride salt, (b) mono-hydrochloride salt, (c) free base, (g) gallinaceum in the chick, Q, quinine equivalent (based on lophurae in the duck, unless otherwise indicated).

| Type | Code No. | Name: α-4-Quinoline Methanol | Salt | M. P., °C. | Q |
|---|---|---|---|---|---|
| 2-unsubstituted compounds, with or without halogen or other substituents. | King-Work (C) | α-(dibutylaminomethyl) | | | 0.3 |
| | 2,553 | α-(diethylaminomethyl)-6-methoxy | | | (g).15 |
| | 9,796 | α-(butylethylaminomethyl)-6-methoxy | | | 0.3 |
| | 7,997 | α-(i-butylpropylaminomethyl)-6-methoxy | | | 0.08 |
| | 7,995 | α-(butylpropylaminomethyl)-6-methoxy | | | 0.04 |
| | 2,572 | α-(dihexylaminomethyl)-6-methoxy | | | 0.15 |
| | 9,209 | 6-chloro-α-(diethylaminomethyl) | | | 0.08 |
| | 10,513 | 6-chloro-α-(dibutylaminomethyl) | | | 0.015 |
| | 11,397 | 6-chloro-α-(dihexylaminomethyl) | | | 0.3 |
| | 10,515 | 6-chloro-α-(dioctylaminomethyl) | | | 0.6 |
| | 10,519 | 7-chloro-α-(di-n-octylaminomethyl) | a | 107 –110 | 1.0 |
| 2-Aryl, without halogen, with or without other substituents. | 10,508 | α-(diethylaminomethyl)-2-phenyl | a | 175 –177 | 0.6 |
| | 10,509 | α-(dibutylaminomethyl)-2-phenyl | a | ca. 70 | 0.3 |
| | 10,510 | α-(diamylaminomethyl)-2-phenyl | a | 138 –139 | 0.3 |
| | 10,511 | α-(dioctylaminomethyl)-2-phenyl | b | 116 –117.5 | 2.0 |
| 2-Aryl, without halogen, with or without other substituents. | 13,585 | α-(dihexylaminomethyl)-2-phenyl-7-methyl | a | 138 –140 | 4.0 |
| | 13,524 | α-(dioctylaminomethyl)-2-phenyl-7-methyl | a | 111 –113 | 2.0 |
| | 13,373 | α-(dioctylaminomethyl)-2-phenyl-8-methyl | b | 127.5–129.5 | 2 |
| | 13,631 | α-(dibutylaminomethyl)-2,8-diphenyl | b | 154 –156 | 2 |
| | 13,409 | α-(dioctylaminomethyl)-2,8-diphenyl | b | 148.5–150 | 0.3 |
| | 10,524 | α-(diethylaminomethyl)-2-phenyl-6-methoxy | a | 190 –191.5 | 0.3 |
| | 10,525 | α-(dibutylaminomethyl)-2-phenyl-6-methoxy | a | 198 –204 | 1.0 |
| | 10,526 | α-(diamylaminomethyl)-2-phenyl-6-methoxy | b | 170 –172 | 1 |
| | 11,395 | α-(dihexylaminomethyl)-2-phenyl-6-methoxy | a | 161 –163 | 1 |
| | 12,213 | α-(octylaminomethyl)-2-phenyl-6-methoxy | b | 185 –192 | 1 |
| | 10,527 | α-(dioctylaminomethyl)-2-phenyl-6-methoxy | a | 153 –157 | 2 |
| 2-Aryl, with halogen, with or without other substituents. | 13,841 | 2-(p-chlorophenyl)-α-(di-n-butylaminomethyl) | a | 184 –186 | 8 |
| | 13,648 | 2-(p-chlorophenyl)-α-(di-n-hexylaminomethyl) | b | 145 –147 | 8 |
| | 13,030 | 2-(p-chlorophenyl)-α-(di-n-octylaminomethyl) | a | 135 –137 | (g)2 |
| | 13,031 | 2-(p-chlorophenyl)-α-(di-n-octylaminomethyl-6-methoxy | b | 156 –157 | 4 |
| | 13,601 | 2-(p-chlorophenyl)-α-(di-n-butylaminomethyl)-8-phenyl | b | 171 –171.5 | 4 |
| | 13,633 | 8-chloro-α-(di-n-butylaminomethyl)-2-phenyl | b | 173 –174 | 2 |
| | 12,713 | 8-chloro-α-(di-n-hexylaminomethyl)-2-phenyl | b | 173 –175 | 4 |
| | 13,085 | 8-chloro-α-(di-n-octylaminomethyl)-2-phenyl | b | 113 –115 | 2 |
| | 13,634 | 8-chloro-2-(p-chlorophenyl)-α-(di-n-butylaminomethyl) | b | 180 –182 | 8 |
| | 12,673 | 8-chloro-2-(p-chlorophenyl)-α-(di-n-hexylaminomethyl) | b | 168 –169 | 8 |
| 2-Aryl, with halogen, with or without other substituents. | 10,521 | 7-chloro-α-(di-n-butylaminomethyl)-2-phenyl | a | 108 –110 | 4 |
| | 10,522 | 7-chloro-α-(di-n-amylaminomethyl(-2-phenyl | a | 114 –116 | 8 |
| | 11,441 | 7-chloro-α-(di-n-hexylaminomethyl)-2-phenyl | a | 117 | 8 |
| | 10,523 | 7-chloro-α-(di-n-octylaminomethyl)-2-phenyl | a | 140 | 2 |
| | 12,672 | 7-chloro-α-(mono-n-octylaminomethyl)-2-phenyl | c | 100 | 4 |
| | 13,710 | 7-chloro-2-(p-chlorophenyl)-α-(di-n-butylaminomethyl) | a | 186 –187 | 16 |
| | 12,711 | 7-chloro-2-(p-chlorophenyl)-α-(di-n-hexylaminomethyl) | a | 192 –194 | 16 |
| | 13,027 | 7-chloro-2-(p-methoxyphenyl)-α-(di-n-octylaminomethyl) | b | 121 –123 | 2 |
| | 13,571 | 6,8-dichloro-α-(di-ethylaminomethyl)-2-phenyl | b | 222 –223 | 4 |
| | 13,632 | 6,8-dichloro-α-(di-n-propylaminomethyl)-2-phenyl | b | 212 –213 | 4 |
| | 12,209 | 6,8-dichloro-α-(di-n-butylaminomethyl)-2-phenyl | b | 183 –185 | 4 |
| | 13,635 | 6,8-dichloro-α-(di-n-amylaminomethyl)-2-phenyl | b | 201 –202 | 8 |
| | 12,674 | 6,8-dichloro-α-(di-n-hexylaminomethyl)-2-phenyl | b | 195 –196 | 8 |
| | 14,220 | 6,8-dichloro-2-(p-chlorophenyl)-α-methyl-isopropylaminomethyl. | a | 204 –206 | 32 |
| | 14,182 | 6,8-dichloro-2-(p-chlorophenyl)-α-(diethylaminomethyl). | a | 220 –221 | 32 |
| | 14,317 | 6,8-dichloro-2-(p-chlorophenyl)-α-(n-butylaminomethyl). | a | 227 | 32 |
| | 14,062 | 6,8-dichloro-2-(p-chlorophenyl)-α-(di-n-butylaminomethyl). | a | 202 –203 | 32 |
| | 12,678 | 6,8-dichloro-2-(p-chlorophenyl)-α-(di-n-hexylaminomethyl). | b | 183 –185 | 8+ |
| 2-Aryl, with halogen, with or without other substituents. | 13,630 | 2-(p-chlorophenyl)-α-(di-n-hexylaminomethyl)-7-methyl. | b | 161 –162 | 16 |
| | 13,721 | 2-(p-chlorophenyl)-α-(di-n-butylaminomethyl)-8-methyl. | b | 193 –195 | 16 |
| | 13,649 | 2-(p-chlorophenyl)-α-(di-n-hexylaminomethyl)-8-methyl. | b | 147 –149 | 8 |
| | 13,711 | 7-chloro-α-(di-n-butylaminomethyl)-8-methyl-2-phenyl | b | 188 –189 | 4 |
| | 13,602 | 7-chloro-α-(di-n-hexylaminomethyl)-8-methyl-2-phenyl. | b | 156 –160 | 16 |
| | 14,070 | 7-chloro-2-(p-chlorophenyl)-α-(di-ethylaminomethyl)-8-methyl. | b | 218 –220 | 20 |
| | 13,815 | 7-chloro-2-(p-chlorophenyl)-α-(di-n-butylaminomethyl)-8-methyl. | b | 203 –205 | 32+ |
| | 13,720 | 7-chloro-2-(p-chlorophenyl)-α-(di-n-hexylaminomethyl)-8-methyl. | b | 195 –196.5 | 8 |

From these data, it will be apparent that in this series of compounds of Class (E), on the basis of tests against *P. lophurae* in the duck, the following general conclusions may be drawn:

(1) That the replacement, by halogen, of the 6, 7 and/or 8 hydrogen atoms in the benzenoid ring of the quinoline nucleus produces roughly a 2 to 4 fold enhancement in antimalarial activity, provided the alkylaminomethyl group is appropriately selected;

(2) That the replacement, by halogen, of the para-hydrogen atom in the phenyl group attached to the 2-position of the quinoline nucleus produces at least about a 4 fold enhancement in antimalarial potency, provided again that the alkylaminomethyl group is appropriately selected;

(3) That the replacement, by halogen, of (a) the 6, 7 and/or 8 hydrogen atoms of the benzenoid ring, as well as (b) the para-hydrogen in the phenyl group, produces at least about a 4–16 fold enhancement in activity, also provided the nucleus-side chain relation is properly adjusted.

*Clinical experience.*—Of the drugs summarized in Table I, the following have received trial for their effectiveness in human malaria:

SN 10,525
SN 10,527
SN 11,441

The clinical examination of the above three drugs has been limited to the demonstration that the series as described in this case, generally speaking, may be expected to have antimalarial activity in human *vivax* malaria. The study has not been sufficiently extensive to establish the comparative value of members covered in this case in the avian and human malarias.

In the foregoing specification we have set forth not only the general principles involved but also a large number of specific examples of preferred embodiments of the present invention. From the type and number of the illustrative examples given, it will be readily apparent to those skilled in the art that a great many variations, modifications and extensions of the principles involved may be made without departing from the spirit and scope of the invention. All such variations, modifications and extensions are therefore to be understood as embraced within the ambit of the appended patent claims.

Having thus described our invention, what we claim as new and wish to secure by Letters Patent is:

1. A new series of carbinols having the characteristic structural formula:

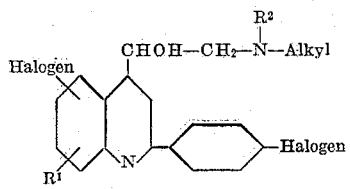

where $R^1$ is selected from the group consisting of hydrogen, halogen, alkyl, alkoxy and aryl; and $R^2$ is selected from the group consisting of hydrogen and alkyl.

2. A new compound having the characteristic structural formula:

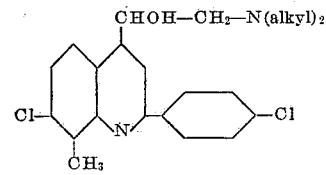

wherein each alkyl group attached to the side chain nitrogen has between 2 and 10 carbon atoms.

3. A new compound having the characteristic structural formula:

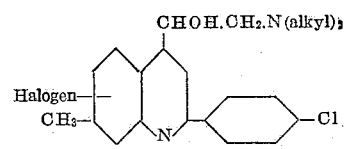

wherein each alkyl group attached to the side chain nitrogen has between 2 and 10 carbon atoms.

4. A new compound having the characteristic structural formula:

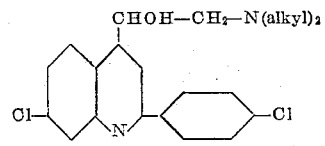

wherein each alkyl group attached to the side chain nitrogen has between 2 and 10 carbon atoms.

ROBERT E. LUTZ.
JOSEPH B. KOEPFLI.
EDWIN R. BUCHMAN.

REFERENCES CITED

The following references are of record in the file of this patent:

UNITED STATES PATENTS

| Number | Name | Date |
|---|---|---|
| 1,434,306 | Miescher | Oct 31, 1922 |
| 1,891,980 | Hartmann et al. | Dec. 27, 1932 |

OTHER REFERENCES

King et al., J. Chem. Soc. (London), 1940, pp. 1307–1315.

Gilman et al., J. Am. Chem. Soc., 68 pp. 1849–1850 (submitted for publication Apr. 5, 1946).

Winstein et al., J. Am. Chem Soc., 68, pp. 1831–1837 (submitted for publication Apr. 5, 1946).